United States Patent
Fukuoka

(10) Patent No.: US 10,747,424 B2
(45) Date of Patent: Aug. 18, 2020

(54) INFORMATION PROCESSING APPARATUS FOR RECOGNIZING MULTI-TOUCH OPERATION BY WHICH OBJECT IS ROTATED

(71) Applicant: KYOCERA Document Solutions Inc., Osaka (JP)

(72) Inventor: Junichi Fukuoka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/260,357

(22) Filed: Jan. 29, 2019

(65) Prior Publication Data
US 2019/0243538 A1 Aug. 8, 2019

(30) Foreign Application Priority Data
Feb. 2, 2018 (JP) ................. 2018-016964

(51) Int. Cl.
*G06F 3/0488* (2013.01)
*G06F 3/0484* (2013.01)

(52) U.S. Cl.
CPC ...... *G06F 3/04883* (2013.01); *G06F 3/04845* (2013.01); *G06F 2203/04808* (2013.01)

(58) Field of Classification Search
CPC ............. G06F 3/04883; G06F 3/04845; G06F 2203/04808; G06F 3/0416
See application file for complete search history.

(56) References Cited

U.S. PATENT DOCUMENTS

| | | |
|---|---|---|
| 7,812,826 B2 | 10/2010 | Ording et al. |
| 9,569,089 B2 | 2/2017 | Ording et al. |
| 2007/0152984 A1 | 7/2007 | Ording et al. |
| 2011/0043527 A1 | 2/2011 | Ording et al. |
| 2013/0271430 A1* | 10/2013 | Nakamura .......... G06F 3/04883 345/178 |

FOREIGN PATENT DOCUMENTS

JP   2009522669 A   6/2009

* cited by examiner

*Primary Examiner* — Li P Sun
*Assistant Examiner* — Zelalem W Shalu
(74) *Attorney, Agent, or Firm* — Studebaker & Brackett PC

(57) ABSTRACT

An information processing apparatus includes a display section, a touch count determining section, a rotation angle detector, a rotation angle determining section, and an image processing section. The display section displays an object. The touch count determining section determines a touch count on the display section. The touch count is a number of touch points on the display section. The rotation angle detector detects a rotation angle of a touch action including multiple touch points on the display section as a rotation specification angle. The rotation angle determining section determines a rotation performance angle by which the object is rotated based on the rotation specification angle and the touch count. The image processing section rotates the object by the rotation performance angle.

5 Claims, 5 Drawing Sheets

| Touch count | Rotation angle $\theta y$ |
|---|---|
| 2 | $\alpha 1 \times \theta x$ |
| 3 | $(\alpha 2 \times \theta x / \theta a1) \times \theta b1$ |
| 4 | $(\alpha 3 \times \theta x / \theta a2) \times \theta b2$ |
| 5 | $(\alpha 4 \times \theta x / \theta a3) \times \theta b3$ |

$\alpha 1$, $\alpha 2$, $\alpha 3$, and $\alpha 4$ are arbitrary coefficients.
The following is set, for example: $\alpha 1 = \alpha 2 = \alpha 3 = \alpha 4 = 1$.
$\theta a1$, $\theta a2$, and $\theta a3$ are arbitrary unit degrees determining a rotation unit count.
The following is set, for example: $\theta a1 = \theta a2 = \theta a3 = 5°$.
$\theta b1$, $\theta b2$, and $\theta b3$ are fixed rotation angles per rotation unit, with a relationship of $\theta b1 < \theta b2 < \theta b3$.
The following are set, for example: $\theta b1 = 5°$
$\theta b2 = 15°$
$\theta b3 = 45°$

FIG. 5

INFORMATION PROCESSING APPARATUS FOR RECOGNIZING MULTI-TOUCH OPERATION BY WHICH OBJECT IS ROTATED

INCORPORATION BY REFERENCE

The present application claims priority under 35 U.S.C. § 119 to Japanese Patent Application No. 2018-016964, filed on Feb. 2, 2018. The contents of this application are incorporated herein by reference in their entirety.

BACKGROUND

The present disclosure relates to an information processing apparatus which includes a touch panel.

In recent years, an information processing apparatus has been proposed which simultaneously detects touch actions at multiple points on a touch panel and performs a corresponding operation on an object. The information processing apparatus implements an operation on a displayed image such as enlargement, reduction, or rotation of the displayed image according to a gesture operation on the touch panel such as an increase in an interval between two fingers, a decrease in an interval between two fingers, or rotation of a finger on the touch panel.

SUMMARY

An information processing apparatus according to an aspect of the present disclosure includes a display section, a touch count determining section, a rotation angle determining section, a rotation angle detector, and an image processing section. The display section displays an object. The touch count determining section determines a touch count on the display section. The touch count is a number of touch points on the display section. The rotation angle detector detects a rotation angle of a touch action including multiple touch points on the display section as a rotation specification angle. The rotation angle determining section determines a rotation performance angle by which the object is rotated based on the rotation specification angle and the touch count. The image processing section rotates the object by the rotation performance angle determined by the rotation angle determining section.

BRIEF DESCRIPTION OF THE DRAWINGS

FIG. 5 is a descriptive diagram describing an action of a rotation angle determining section.

DETAILED DESCRIPTION

Figure 1:
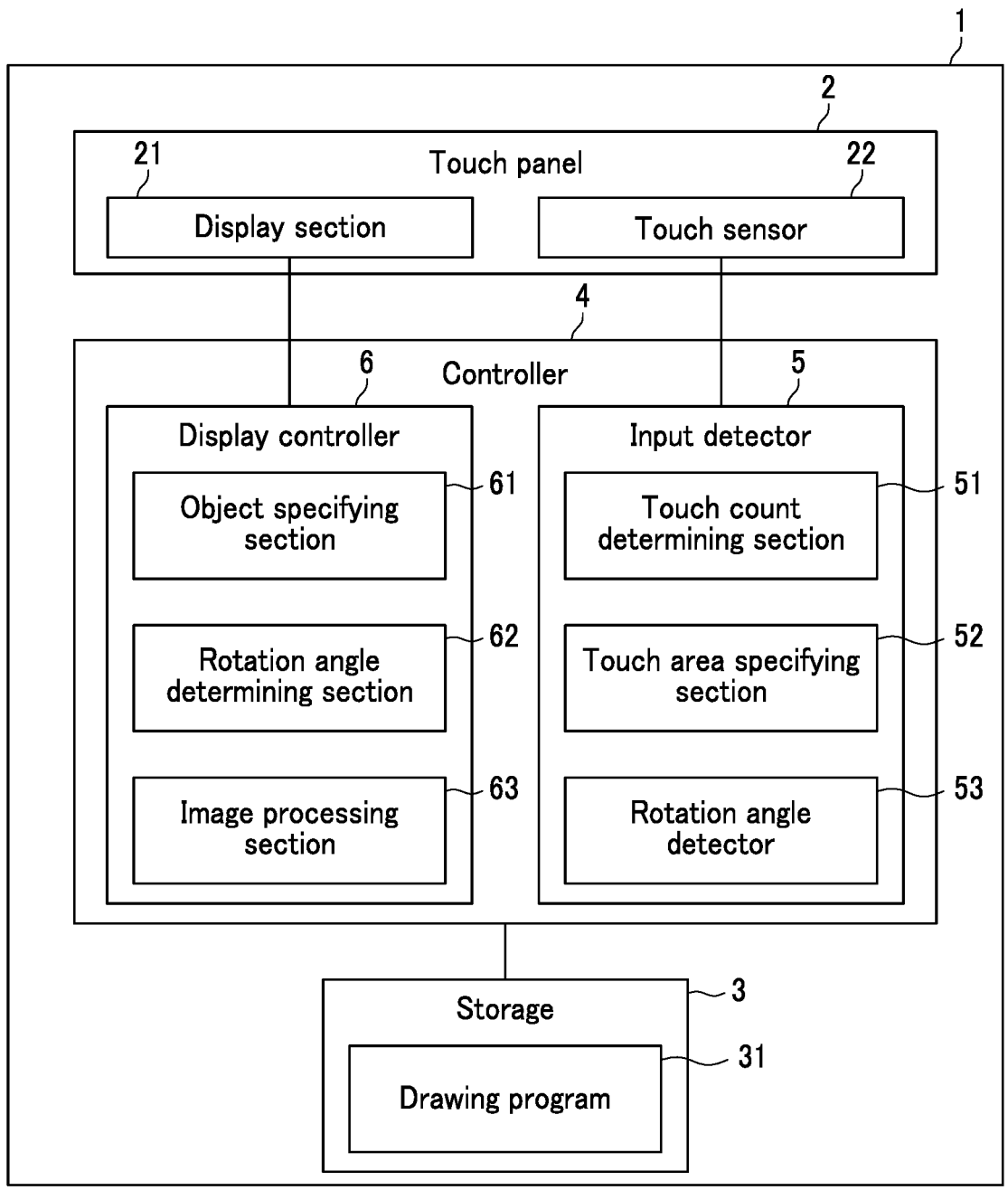
FIG. 1 is a block diagram illustrating a general configuration of an embodiment of an information processing apparatus according to the present disclosure.

The following describes an embodiment of the present disclosure in detail with reference to the accompanying drawings. Note that in the following embodiment, elements that are the same or equivalent are labeled with the same reference signs in the drawings and description thereof is not repeated.

An information processing apparatus 1 according to the present embodiment is for example a computer such as a tablet or a smartphone. As illustrated in FIG. 1, the information processing apparatus 1 includes a touch panel 2, storage 3, and a controller 4.

The touch panel 2 includes a display section 21 and a touch sensor 22. The display section 21 includes a liquid-crystal display, an organic electroluminescent (EL) display, a plasma display, or electronic paper, for example.

The touch sensor 22 is a transparent sheet located on an upper surface of the display section 21. Upon a finger of a user touching the display section 21, the touch sensor 22 detects a position of the finger of the user on the display section 21. The touch sensor 22 then outputs coordinates (input coordinates) on the display section 21 corresponding to the detected position to the controller 4. Examples of the touch sensor 22 include a capacitive touch sensor, an ultrasonic touch sensor, a pressure-sensitive touch sensor, a resistive touch sensor, and an optical touch sensor.

The touch sensor 22 is a multiple-point touch action-adaptive touch sensor. That is, the touch sensor 22 detects positions corresponding to the multiple-point touch action and outputs coordinates (input coordinates) on the display section 21 corresponding to the detected positions to the controller 4. Upon performance of the multiple-point touch action on the display section 21, the touch sensor 22 outputs multiple input coordinates respectively corresponding to the positions of the multiple-point touch action to the controller 4. The multiple-point touch action means an action in which multiple fingers touch multiple positions on the display section 21. A position of a touch action means a position touched by a finger on the display section 21.

The storage 3 includes for example non-volatile memory such as flash memory. A drawing program 31 which creates, processes, and edits either or both of images and figures is installed to the storage 3.

The controller 4 for example includes a central processing unit (CPU), read-only memory (ROM), and random-access memory (RAM). A control program for performing action control of the information processing apparatus 1 is stored in the ROM. The CPU of the controller 4 functions as an input detector 5 and a display controller 6 by reading out the control program stored in the ROM, loading the control program into the RAM, and executing the control program.

The input detector 5 receives an operation on an object displayed in the display section 21 based on the input coordinates output from the touch sensor 22. In a state where an object is displayed on the display section 21, the input detector 5 functions as a touch count determining section 51, a touch area specifying section 52, and a rotation angle detector 53 with the execution of the drawing program 31.

The display controller 6 controls display of the object on the display section 21. In the state where an object is displayed on the display section 21, the display controller 6 functions as an object specifying section 61, a rotation angle determining section 62, and an image processing section 63 with the execution of the drawing program 31.

Figure 2A:
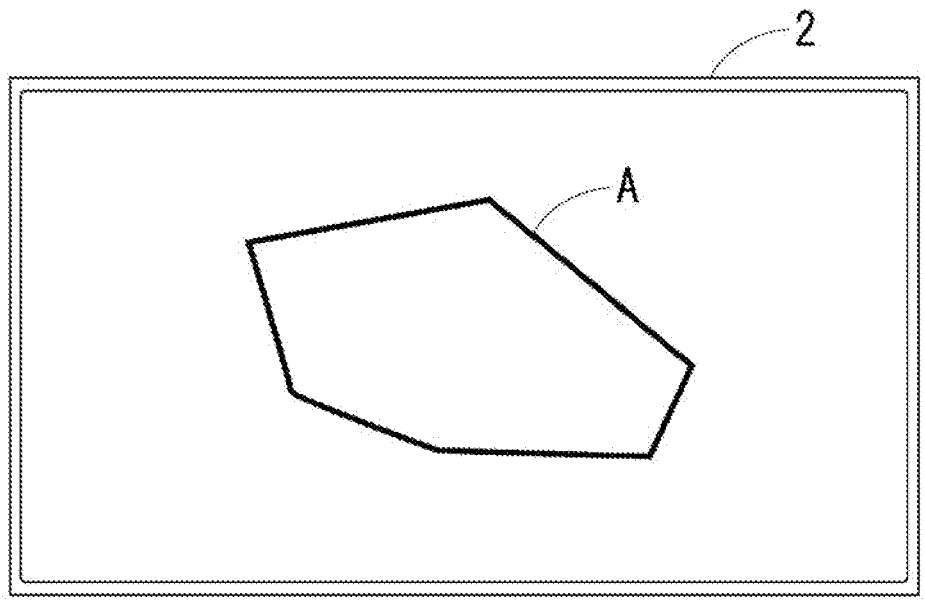
FIG. 2A is a first diagram illustrating a display example on a touch panel.

The following describes a rotation operation of the object displayed on the display section 21 with reference to FIGS. 2A to 5. FIG. 2A illustrates a state where an object A is displayed on the display section 21.

Figure 3:
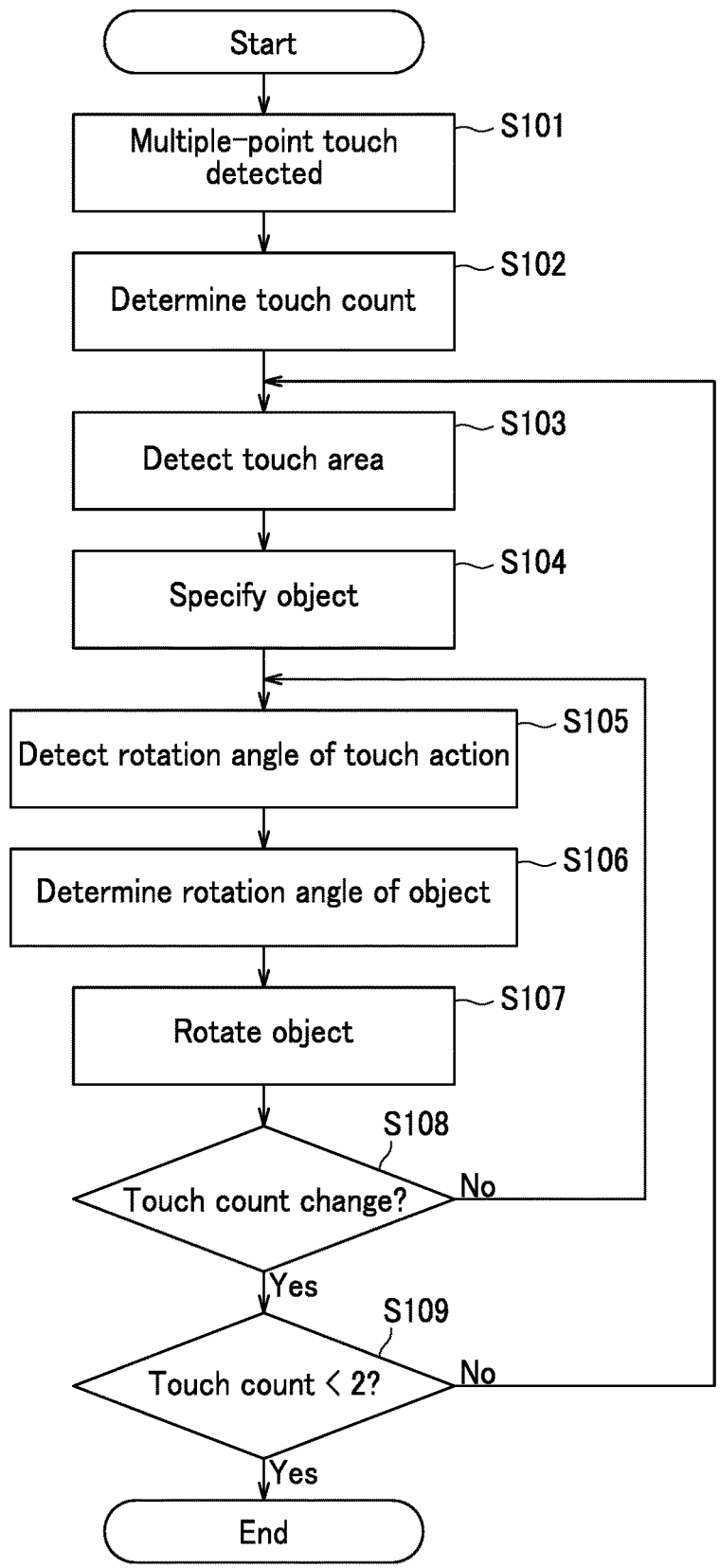
FIG. 3 is a flowchart describing a rotation operation of an object by the information processing apparatus.

As illustrated in FIG. 3, when the multiple-point touch action is detected on the display section 21 through the touch panel 2 (touch sensor 22) (Step S101), the touch count determining section 51 determines a touch count on the display section 21 (Step S102). The touch area specifying section 52 then detects a touch area defined by multiple touch points (Step S103). A touch point means a position touched by a finger on the display section 21.

Figure 2B:
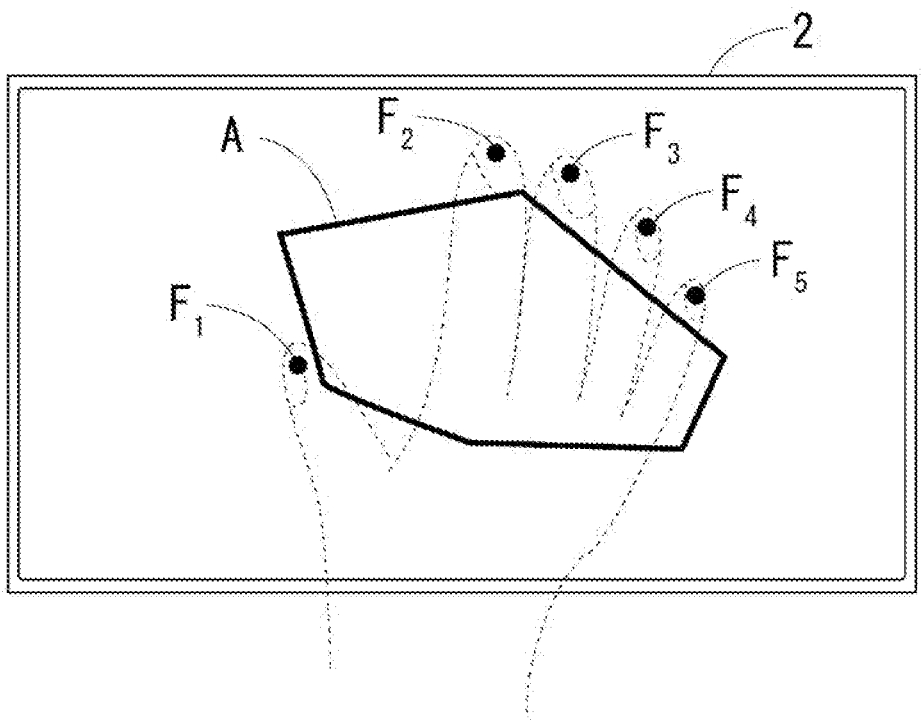
FIG. 2B is a second diagram illustrating the display example on the touch panel.

FIG. 2B illustrates a state where five fingers are touching the touch panel 2 (display section 21). FIG. 2B illustrates a touch point $F_1$ which is the touch point of a first finger, a touch point $F_2$ which is the touch point of a second finger, a touch point $F_3$ which is the touch point of a third finger, a touch point $F_4$ which is the touch point of a fourth finger, and a touch point $F_5$ which is the touch point of a fifth finger. The touch count determining section 51 in Step S102 counts the number of touch points (number of touching fingers) as the touch count. The touch count, in other words, means the number of fingers simultaneously touching the display section 21.

In Step S103, the touch area specifying section 52 specifies an area inside of a polygonal shape in which the touch points are vertices to be the touch area. For example, when there are three touch points: the touch points $F_1$, $F_2$, and $F_3$, the area inside of a three-sided figure connecting $F_1$, $F_2$, and $F_3$ is specified as the touch area. When the touch count is two, a line segment connecting two touch points is specified as the touch area. For example, when there are two touch points: the touch points $F_1$ and $F_2$, the line segment connecting $F_1$ and $F_2$ is specified as the touch area.

Next, the object specifying section 61 specifies an object overlapping with the touch area specified in Step S103 (Step S104). As illustrated in FIG. 2B, multiple touch points composed of the touch points $F_1$ to $F_5$ are detected according to the present embodiment. In this case, because the touch area specified in Step S103 (area inside of a five-sided figure connecting the touch points $F_1$ to $F_5$) overlaps with the object A, the object A is specified. The touch area overlapping with the object A means that a part or all of the touch area overlaps with all or a part of the object A. When all or a part of the touch area overlaps with a part or all of each of a plurality of objects, the plurality of objects is specified.

Figure 4A:
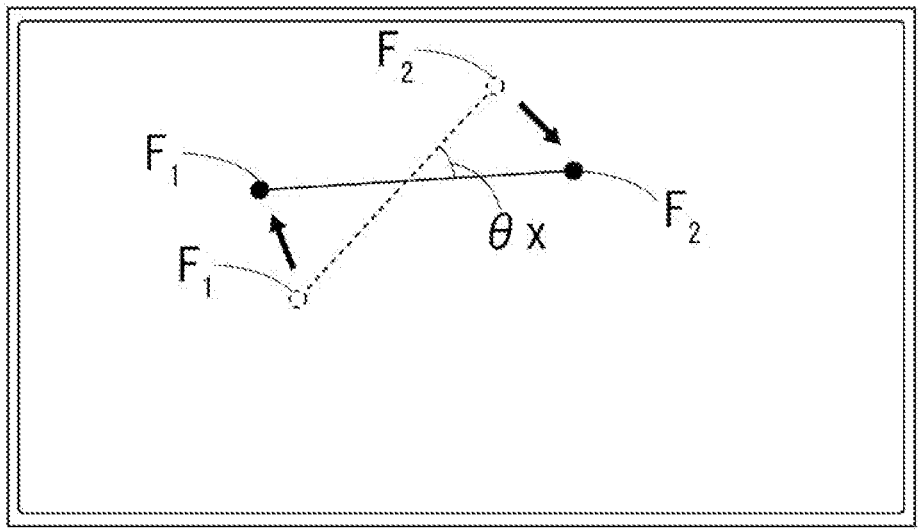
FIG. 4A is a first descriptive diagram describing an action of a rotation angle detector.

Next, the rotation angle detector 53 detects a rotation angle of the touch action on the display section 21 as a rotation specification angle $\theta x$ (Step S105). The rotation angle detector 53 detects the rotation specification angle $\theta x$ based on the rotation angle of a touch line segment on the display section 21. The touch line segment means a line segment connecting two of the multiple touch points. The rotation angle detector 53 determines the two touch points defining the touch line segment among the multiple touch points according to a predetermined rule. For example, when the touch count is two (touch points $F_1$ and $F_2$) as illustrated in FIG. 4A, the rotation angle detector 53 determines the two touch points defining the touch line segment to be the touch points $F_1$ and $F_2$. The rotation angle detector 53 then stores an original position of the touch points $F_1$ and $F_2$ in the storage 3 as an initial position. When the touch points $F_1$ and $F_2$ are moved in a direction indicated by arrows, the rotation angle detector 53 detects an angle formed by the initial position and a current position of the touch line segment connecting the touch points $F_1$ and $F_2$ as the rotation specification angle $\theta x$. When the touch count is three or greater, the rotation angle detector 53 may determine the two touch points defining the touch line segment based on a sequence of touches. For example, the rotation angle detector 53 may determine the first and second touch points detected to be the two touch points defining the touch line segment among the three or more touch points. Also when the touch count is three or greater, the rotation angle detector 53 may determine two touch points that are most separated to be the two touch points defining the touch line segment among the three or more touch points.

Next, the rotation angle determining section 62 determines a rotation performance angle $\theta y$ by which the object specified in Step S104 is rotated on the display section 21 based on the rotation specification angle $\theta x$ detected in Step S105 and the touch count determined in Step S102 (Step S106). According to the present embodiment, a method of determining the rotation performance angle $\theta y$ differs according to the touch count, as illustrated in FIG. 5.

When the touch count is two, the rotation angle determining section 62 determines the rotation performance angle $\theta y$ by multiplying the rotation specification angle $\theta x$ by an arbitrary coefficient $\alpha 1$. That is, when the touch count is two, the rotation angle determining section 62 determines the rotation performance angle $\theta y$ to be a value proportional to the rotation specification angle $\theta x$. Therefore, the rotation performance angle $\theta y$ varies linearly according to the rotation specification angle $\theta x$. For example, when the coefficient $\alpha 1$ is set to 1 and the rotation specification angle $\theta x$ is 12°, the rotation performance angle $\theta y$ is also determined to be 12°.

When the touch count is three or greater, the rotation angle determining section 62 determines a rotation unit based on the rotation specification angle $\theta x$. The rotation angle determining section 62 then determines the rotation performance angle $\theta y$ by multiplying the determined rotation unit by a fixed rotation angle preset according to the touch count.

When the touch count is three, the rotation angle determining section 62 multiplies the rotation specification angle $\theta x$ by an arbitrary coefficient $\alpha 2$ and then divides the resulting value by a unit angle $\theta a1$ to calculate a first reference value. The rotation angle determining section 62 then determines an integer part in the calculation of the first reference value to be the rotation unit. For example, when the coefficient $\alpha 2$ is set to 1, the unit angle $\theta a1$ is set to 5°, and the rotation specification angle $\theta x$ is 12°, the rotation unit is determined to be 2. The rotation angle determining section 62 then multiplies the rotation unit by a fixed rotation angle $\theta b1$ to determine the rotation performance angle $\theta y$. The fixed rotation angle $\theta b1$ is a preset angle corresponding to a touch count of three. For example, when the fixed rotation angle $\theta b1$ is set to 5° and the rotation unit is 2, the rotation performance angle $\theta y$ is determined to be 10°. The first reference value is a first example of a reference value according to the present disclosure.

When the touch count is four, the rotation angle determining section 62 multiplies the rotation specification angle $\theta x$ by an arbitrary coefficient $\alpha 3$ and then divides the resulting value by a unit angle $\theta a2$ to calculate a second reference value. The rotation angle determining section 62 then determines an integer part in the calculation of the second reference value to be the rotation unit. For example, when the coefficient $\alpha 3$ is set to 1, the unit angle $\theta a2$ is set to 5°, and the rotation specification angle $\theta x$ is 12°, the rotation unit is determined to be 2. The rotation angle determining section 62 then multiplies the rotation unit by a fixed rotation angle $\theta b2$ to determine the rotation performance angle $\theta y$. The fixed rotation angle $\theta b2$ is an angle preset corresponding to a touch count of four. The fixed rotation angle $\theta b2$ is greater than the fixed rotation angle $\theta b1$, for example. For example, when the fixed rotation angle $\theta b2$ is set to 15° and the rotation unit is 2, the rotation performance angle $\theta y$ is determined to be 30°. The second reference value is a second example of the reference value according to the present disclosure.

When the touch count is five, the rotation angle determining section 62 multiplies the rotation specification angle $\theta x$ by an arbitrary coefficient $\alpha 4$ and then divides the resulting value by a unit angle $\theta a3$ to calculate a third reference value. The rotation angle determining section 62 then determines an integer part in the calculation of the third reference value to be the rotation unit. For example, when the coefficient $\alpha 4$ is set to 1, the unit angle $\theta a3$ is set to 5°, and the rotation specification angle $\theta x$ is 12°, the rotation unit is determined to be 2. The rotation angle determining section 62 then multiplies the rotation unit by a fixed rotation angle $\theta b3$ to determine the rotation performance angle $\theta y$. The fixed rotation angle $\theta b3$ is an angle preset corresponding to a touch count of five. The fixed rotation angle $\theta b3$ is greater than the fixed rotation angle $\theta 2$, for example. For example, when the fixed rotation angle $\theta b2$ is set to 45° and the rotation unit is 2, the rotation performance angle $\theta y$ is determined to be 90°. The third reference value is a third example of the reference value according to the present disclosure.

The coefficients $\alpha 1$ to $\alpha 4$, the unit angles $\theta a1$ to $\theta a3$, and the fixed rotation angles $\theta b1$ to $\theta b3$ are each preset. The coefficients $\alpha 1$ to $\alpha 4$, the unit angles $\theta a1$ to $\theta a3$, and the fixed rotation angles $\theta b1$ to $\theta b3$ are each stored in the storage 3. The coefficients $\alpha 1$ to $\alpha 4$ are examples of a predetermined coefficient according to the present disclosure. The unit angles $\theta a1$ to $\theta a3$ are examples of a predetermined unit angle according to the present disclosure.

The coefficients $\alpha 1$ to $\alpha 4$ are set according to the touch count. Note that the coefficients $\alpha 1$ to $\alpha 4$ need not be related to the touch count, and may be all set to the same value.

The unit angles $\theta a1$ to $\theta a3$ are set according to the touch count. Note that the unit angles $\theta a1$ to $\theta a3$ need not be related to the touch count, and may be all set to the same value.

Next, the image processing section 63 rotates the object specified in Step S104 on the display section 21 by the rotation performance angle $\theta y$ specified in Step S106 (Step S107).

Next, the touch count determining section 51 determines whether or not the touch count has changed (Step S108). When the touch count is determined not to have changed in Step S108, the process then returns to Step S105. Then, the rotation operation of the object according to movement of the touch points is performed.

When the touch count is determined to have changed in Step S108, the touch count determining section 51 determines whether or not the touch count has become less than two (a single touch or no touch) (Step S109). When the touch count is determined to have become less than two in Step S109, the rotation operation of the object is ended.

When the touch count is determined to be two or greater in Step S109, the process returns to Step S103. Thereafter, the rotation operation of the object is performed with a different touch count.

Figure 4B:
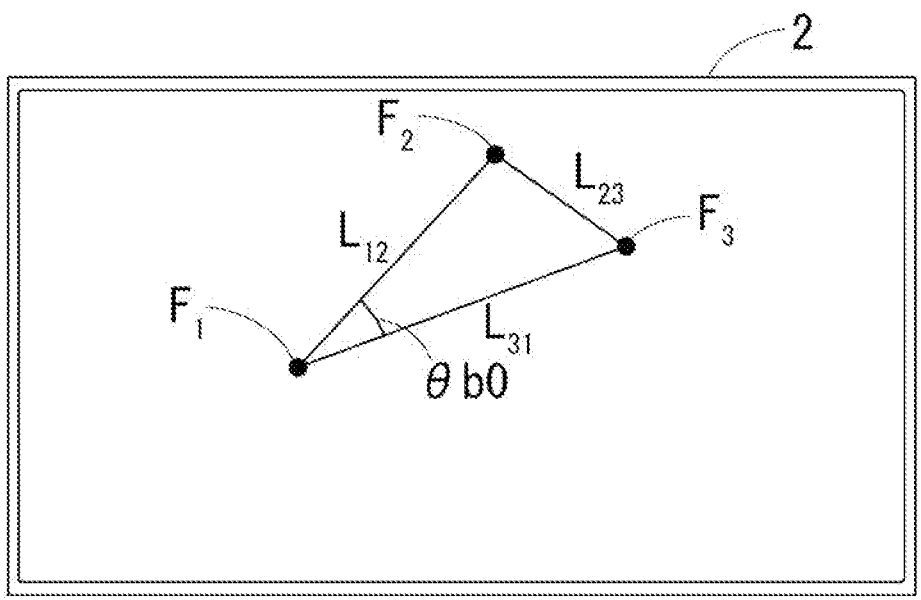
FIG. 4B is a second descriptive diagram describing an action of the rotation angle detector.

Note that although the fixed rotation angle is set according to the touch count in the configuration of the present embodiment, the rotation angle determining section 62 may determine the fixed rotation angle according to the positions of the multiple touch points. For example, as illustrated in FIG. 4B, the rotation angle determining section 62 focuses on the three touch points $F_1$, $F_2$, and $F_3$, and determines an angle formed by the longest line segment $L_{12}$ and the next longest line segment $L_{31}$ to be a fixed rotation angle $\theta b0$. Therefore, a fixed rotation angle desired by the user can be easily set.

As described above, the information processing apparatus 1 includes the touch panel 2 according to the present embodiment. The information processing apparatus 1 also includes the touch count determining section 51, the rotation angle detector 53, the rotation angle determining section 62, and the image processing section 63. The touch count determining section 51 determines the touch count by detecting the multiple touch points on the touch panel 2 on which an object is displayed. The rotation angle detector 53 detects the rotation angle of the touch action as the rotation specification angle $\theta x$. The rotation angle determining section 62 determines the rotation performance angle $\theta y$ by which the object is rotated based on the rotation specification angle $\theta x$ and the touch count. The image processing section 63 rotates the object by the rotation performance angle $\theta y$. Through this configuration, the rotation operation of the object can be performed accurately with an operation using the multiple-point touch action because the rotation operation of the object can be performed differently according to the touch count.

Additionally, when the touch count is two, the rotation angle determining section 62 according to the present embodiment determines the rotation performance angle $\theta y$ to be a value proportional to the rotation specification angle $\theta x$. When the touch count is three or greater, the rotation angle determining section 62 determines the rotation unit based on the rotation specification angle $\theta x$ and multiplies the rotation unit by an appropriate one of the fixed rotation angles $\theta b1$ to $\theta b3$ set according to the touch count to determine the rotation performance angle $\theta y$. Through this configuration, linear rotation operations and gradual rotation operations can be distinguished and combined according to the touch count, and thus the rotation operation of the object can be accurately performed.

Furthermore, according to the present embodiment, the fixed rotation angles $\theta b1$ to $\theta b3$ are set as values that differ according to the touch count. Through this configuration, fixed rotation angles of gradual rotation operations can be changed according to the touch count, and thus the rotation operation of the object can be performed accurately.

In addition, according to the present embodiment, the information processing apparatus 1 includes the touch area specifying section 52 and the object specifying section 61. The touch area specifying section 52 detects a touch area defined by multiple touch points. The object specifying section 61 specifies an object overlapping with the touch area. The image processing section 63 rotates the object specified by the object specifying section 61. Through this configuration, rotationally symmetrical objects can be easily selected.

Note that the present disclosure is not limited to the above embodiment. It is clear that the embodiment may be appropriately altered within a scope of the technical concept of the present disclosure. Furthermore, the number, position, shape, and the like of constituent elements are not limited to the above embodiment and may be any number, position, shape, or the like suitable for implementing the present disclosure. Note that the same elements of configuration are affixed with the same reference signs in the drawings.

What is claimed is:

1. An information processing apparatus comprising:
   a display configured to display an object;
   a touch sensor configured to detect multiple touch points on the display; and a processor configured to:
- determine a touch count based on the touch points detected by the touch sensor; and
- an angle between two touch line segments as a rotation specification angle, one of the two touch line segments being a segment connecting two touch points of the touch points before being moved, the other of the two touch line segments being a segment connecting the two touch points after being moved;
- determine a rotation performance angle by which the object is rotated based on the rotation specification angle and the touch count; and rotate the object by the rotation performance angle, wherein when the touch count is two, the processor determines the rotation performance angle to be a value proportional to the rotation specification angle, when the touch count is three or greater, the processor determines a rotation unit based on the rotation specification angle and multiplies the rotation unit by a fixed rotation angle to determine the rotation performance angle, and the rotation unit is an integer part in a reference value obtained by dividing by a predetermined unit angle a value obtained by multiplying the rotation specification angle by a predetermined coefficient.

2. The information processing apparatus according to claim 1, wherein
the fixed rotation angle is preset according to the touch count.

3. The information processing apparatus according to claim 1, wherein
the processor determines the fixed rotation angle according to positions of the multiple touch points.

4. The information processing apparatus according to claim 2, wherein
the fixed rotation angle is set to a value which differs according to the touch count.

5. The information processing apparatus according to claim 1, wherein
the processor specifies an area inside of a shape in which the touch points detected by the display are vertices to be a touch area, and
when the object overlaps with the touch area, the processor rotates the object by the rotation performance angle determined by the processor.

* * * * *